Figure 1:
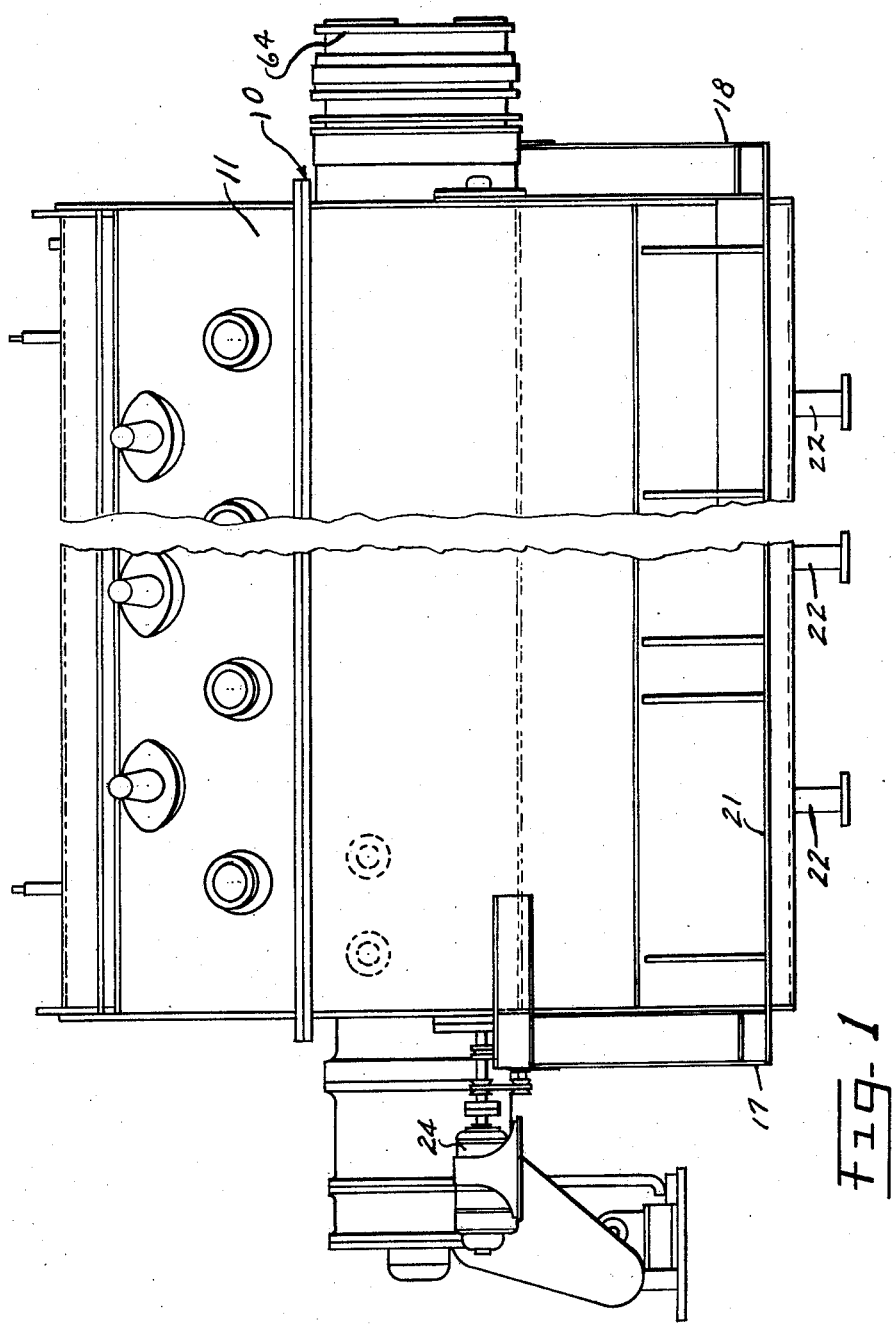

Sept. 8, 1959　　　　　J. W. LITTLE　　　　　2,902,841
ROTARY FILTERS
Filed July 11, 1956　　　　　　　　　　　　　4 Sheets-Sheet 1

INVENTOR.
JOHN W. LITTLE
BY
Jennings & Carter
ATTORNEYS

Sept. 8, 1959  J. W. LITTLE  2,902,841
ROTARY FILTERS
Filed July 11, 1956  4 Sheets-Sheet 2

INVENTOR.
JOHN W. LITTLE
BY Jennings & Carter
ATTORNEYS

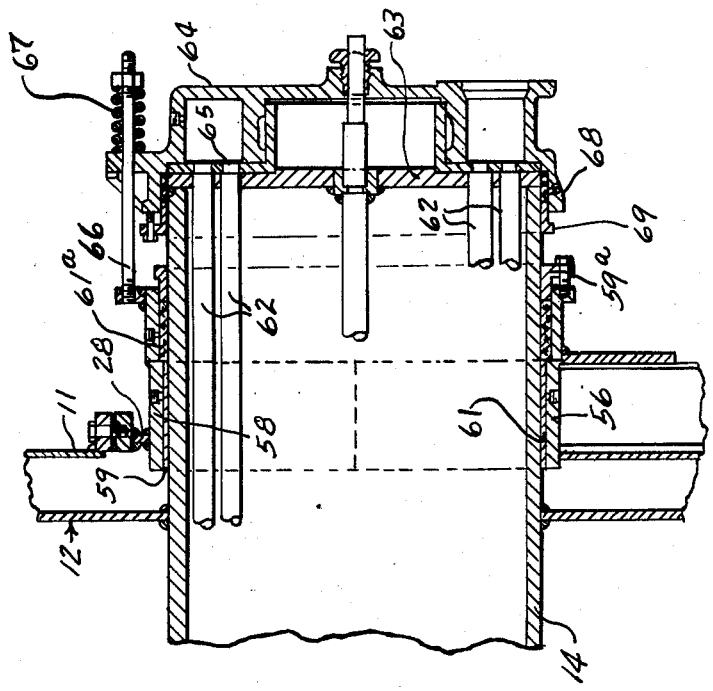
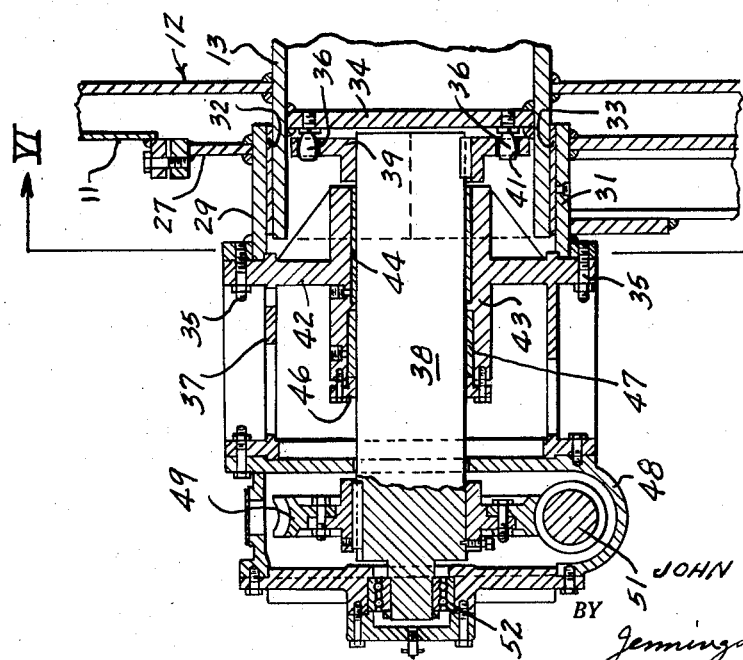

United States Patent Office 2,902,841
Patented Sept. 8, 1959

2,902,841
ROTARY FILTERS

John W. Little, Birmingham, Ala., assignor to Goslin-Birmingham Manufacturing Company, a corporation of Alabama Application July 11, 1956, Serial No. 597,110

1 Claim. (Cl. 64—1)

This invention relates to continuous rotary filters, such as the well known rotary drum or disc filters of the general type shown in my prior Patent No. 2,655,265, dated October 13, 1953, assigned to Goslin-Birmingham Manufacturing Company, and has for an object the provision of apparatus of the character designated which shall include improved means for mounting the rotary assembly of the filter in its casing and in the provision of improved driving means therefor.

A further object of my invention is the provision, in a continuous rotary filter, of improved driving means including a driving assembly supported from the casing, and which shall be assembled as a unit separately from the casing and be mounted as a unit thereon.

A still further object of my invention is the provision of a continuous rotary filter which shall include a rotary filter assembly, a casing in which the trunnion bearings of the assembly and the driving shaft bearings therefor are rigidly connected, with flexible drive means between the driving shaft and the adjacent driven trunnion.

Another object of my invention is to provide a continuous rotary filter including a casing, a rotary filter assembly mounted in the casing, and a drive unit for the rotary assembly mounted on and supported entirely from the casing, with a flexible driving connection between the drive unit and the rotary assembly.

As is well known in the art to which my invention relates, the filter assembly of continuous rotary filters has usually been provided with trunnions on the ends with driving means located at one end and a filtrate valve at the other. The driving mechanism usually included a gear more or less rigidly connected to an extension of one of the trunnions. This trunnion heretofore has been mounted in a bearing supported separately from the casing, or else from the casing by means of a cantilevered support. Difficulties have been encountered with such a construction where, due to unequal wear on the trunnion and outboard bearings, or due to variations in temperature or other conditions within the filter, misalignment of the drive means and trunnions would occur, creating greater friction and wear on bearings and stuffing boxes.

All these and other difficulties are overcome by means of my invention in which I provide a filter casing having trunnion bearings mounted in, and forming a part of the ends of the casing. A drive unit is provided having a housing detachably secured rigidly to, and supported entirely by one end of the casing. A drive shaft mounted in the housing is flexibly connected to the adjacent trunnion which obviates all difficulties due to misalignment. The outer end of the drive shaft is supported in an outboard bearing mounted in the drive unit housing. An inboard bearing for the drive shaft and a stuffing box are disposed in the housing between the flexible connection and the outboard bearing. My improved drive unit may thus be detached bodily from the filter casing and instead of a large stuffing box surrounding the trunnion at the drive end I provide a relatively small stuffing box surrounding the drive shaft. The trunnion bearing at the valve end of the filter assembly is constructed and arranged similar to that at the drive end and the filtrate valve is yieldably secured to the bearing housing at that end.

Figure 2:
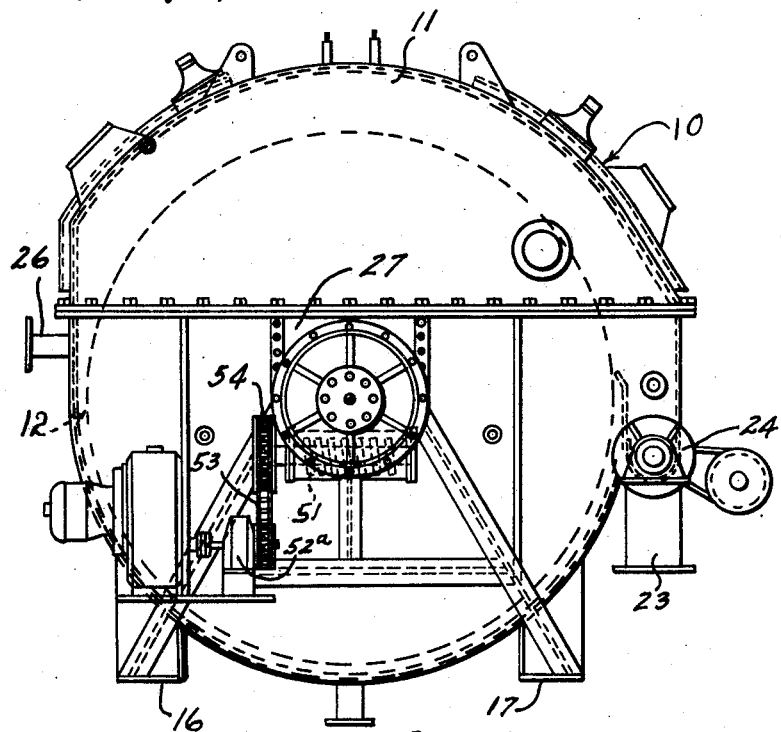
Figure 3:
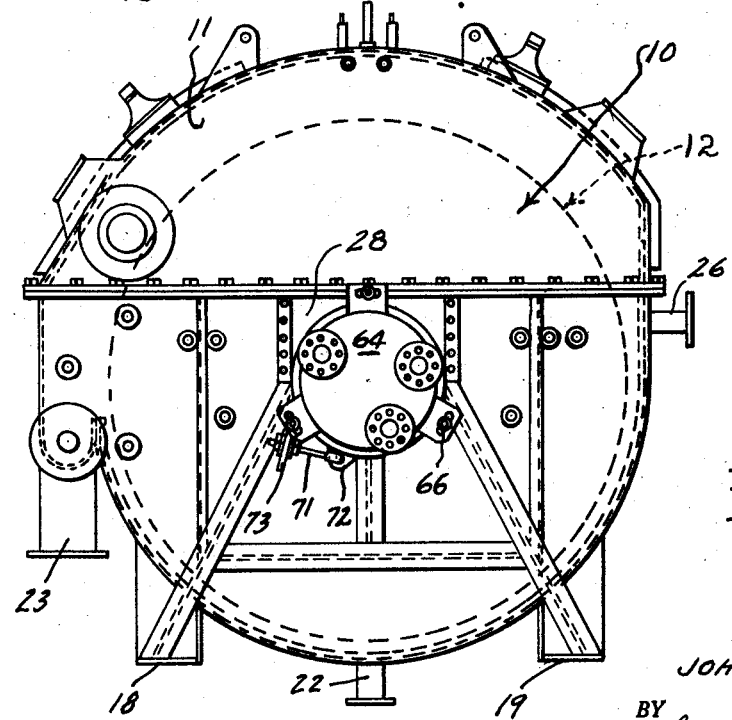
Figure 6:
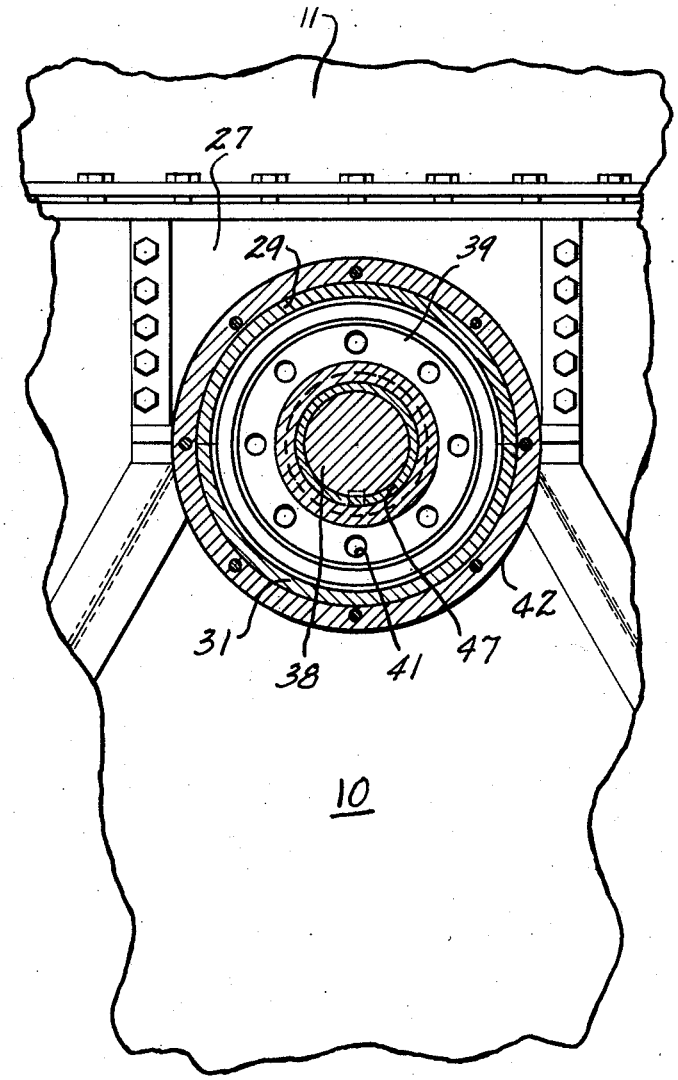

Apparatus embodying features of my invention is illustrated in the accompanying drawings, forming a part of this application, in which:

Fig. 1 is a side elevation of a filter having my improvements incorporated therein;
Fig. 2 is an end elevation of the drive end of the filter;
Fig. 3 is an end elevation of the valve end of the filter;
Fig. 4 is a longitudinal sectional view of the drive end of the filter showing the driving unit and the adjacent end of the casing and rotary filter assembly;
Fig. 5 is a longitudinal sectional view of the valve end of the filter showing the adjacent end of the casing and the filter assembly; and
Fig. 6 is a sectional view taken along the line VI—VI of Fig. 4.

Referring to the drawings for a better understanding of my invention, the filter herein illustrated is of the general type illustrated and described in my prior patent aforesaid, No. 2,655,265. It includes a vat or casing 10, having a cover 11 and having disposed therein a rotary filter assembly 12 which may comprise either a drum type or rotary disc type, as is well understood. The rotary filter assembly is supported by a hollow trunnion 13 at the drive end, and a hollow trunnion 14 at the valve end of the filter. Supporting members 16 and 17 at the drive end of the casing and supporting members 18 and 19 at the valve end of the casing are joined by longitudinal frame members 21 (only one being shown) which are adapted to rest upon a suitable foundation, for the support of the filter. Liquor to be filtered is admitted into the vat 10 through a suitable number of conduits 22 in the bottom of the casing while cake is discharged from the side of the casing through a discharge conduit 23 by means of motor actuated discharge means 24, all as is well understood in the art. With a closed casing such as herein illustrated, air or other gas may be admitted to the casing through a conduit 26 above the level of the liquor to be filtered. All of the foregoing described parts are well known in the art and require no further detailed description.

In accordance with my present invention, the hollow trunnions 13 and 14 are secured to the ends of the drum and project outwardly through the casing. In the example shown, the casing is divided horizontally above the center line of the trunnions and a removable section 27 is provided in the drive end of the casing and a similar section 28 in the valve end of the filter casing 10 to permit removal and assembly of the drum in the casing. Rigidly secured in the casing 10 and removable section 27 so as to form a part of the casing, at the drive end of the filter are the upper and lower halves 29 and 31 of a trunnion bearing housing for the trunnion 13. A suitable bearing comprised of halves 32 and 33 is mounted in the upper and lower halves 29 and 31 of the bearing housing. As will be seen from Fig. 4 of the drawing, the halves 29 and 31 of the bearing housing extend outwardly of the casing, together with the outer end of the trunnion 13. Disposed inwardly of the trunnion 13 is a transverse wall 34 in which is mounted a plurality of outwardly projecting axial pins 36.

Mounted on the bearing housing members 29 and 31 and rigidly secured thereto by bolts 35 with a fluid tight fit, is the housing 37 of my improved drive unit. Mounted in the housing 37 is a drive shaft 38 which has mounted on its inner end a drive plate 39 having a plurality of holes 41 therein which are adapted to receive the axial pins 36 carried by the trunnion plate 34 and form a flexible driving connection between the drive shaft and the trunnion.

The end of the drive unit housing which is attached to the bearing housing members 29 and 31 is constituted by a solid plate 42 having a central sleeve portion 43. At the inner end of the sleeve portion 43 is a sleeve bearing 44 for the drive shaft 38. At the outer end of the sleeve portion 43 is a stuffing box 46 with suitable packing material 47 therein which serves to seal the drive end of the casing against egress or ingress of pressure. On the outer end of the drive unit housing 37, and forming a part thereof, is a worm gear housing 48 in which is located a worm gear 49 and a worm 51, the worm gear 49 being mounted on the drive shaft 38. At the outer end of the shaft 38, within the worm gear housing 48 is an outboard bearing 52 for the shaft 38, which bearing is preferably of the type to withstand both axial thrust and radial load. The worm 51 is driven by means of a motor 52a and sprocket chain 53 through a sprocket 54.

It will be seen from the foregoing description that the drive unit is supported rigidly and entirely from the filter casing and may be detached and removed by removing the attaching bolts 35. It will also be seen that the drive end of the casing is sealed against pressure by means of the single stuffing box 46 which surrounds the drive shaft 38, and that the flexible coupling between the inner end of the drive shaft 38 and the trunnion drive plate 34 insures against any difficulties due to misalignment of the drive shaft and the adjacent trunnion.

Referring now to Fig. 5 the casing 10 is provided at the valve end with a lower trunnion bearing housing member 56 which is mounted in and forms a part of the lower part of the casing and with an upper bearing housing member 58 which is secured in and forms a part of the removable section 28 of the casing 10. Suitable bearing material 59 and 61 is provided in the halves 58 and 56 to form a bearing for the trunnion 14. On the outer end of the bearing housing members 58 and 56 there is provided a stuffing box 59a with suitable packing 61a to seal the casing against the ingress or egress of pressure.

Drain pipes 62 for the various filter sections terminate in a transverse plate 63 in the end of the trunnion 14. A wear plate 65 is mounted over the plate 63 and connects with the drain pipes 62, all as is well understood in the art. At the outer end of the trunnion 14 is a valve 64 for removing filtrate from the drain pipes 62 which valve is secured to the bearing housing members 56 and 58 by means of a plurality of bolts 66, which latter are surrounded by springs 67 disposed between their outer ends and the filter valve, whereby to press it yieldingly against the wear plate 65. The filter valve is provided with a cylindrical portion 68 which fits over the outer end of the trunnion and a stuffing box 69 cooperates between the cylindrical portion 68 and the trunnion 14 to seal the valve and trunnion against leakage therebetween. The position of the filtrate valve 64 may be adjusted angularly by means of an adjusting bolt 71 which is secured at one end to a lug 72 on the filtrate valve 64 and which passes through a bracket 73 provided on the end of the casing.

The various other connections to the filtrate valve 64 are not shown or described herein as they are well understood in the art and form no part of my present invention.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claim.

What I claim is:

In a driving mechanism for a continuous rotary filter having a casing and a hollow circular trunnion extending outwardly from an end of the casing, a circular trunnion drive plate rigidly secured to the inner circumference of the hollow trunnion in spaced relation to the outer end thereof, a plurality of angularly spaced pins secured to said trunnion plate and extending outwardly from the trunnion plate adjacent the outer circumference thereof and in axial relation to the trunnion, a trunnion bearing housing extending around the outer end of said trunnion, a trunnion bearing disposed between the trunnion and the housing to support the trunnion thereon, a drive unit housing removably mounted on and supported by the outer end of said trunnion bearing housing, a drive shaft mounted in said drive unit housing and having an end thereof extending within the hollow trunnion, an annular plate rigidly mounted adjacent the inner end of said shaft and extending radially from said shaft, said annular plate having a plurality of angularly spaced sockets therein adjacent the outer circumference thereof and adapted to be aligned with said pins on the trunnion plate and cooperate therewith to form a flexible coupling between the trunnion and the drive shaft whereby the drive shaft may be disconnected from the trunnion by disconnecting the drive unit housing from the casing, an outboard bearing for the outer end of the drive shaft mounted in the drive unit housing, an inner drive shaft bearing mounted on the drive unit housing between said outboard bearing and said annular plate, a stuffing box surrounding the drive shaft between the inner drive shaft bearing and the outboard bearing, and drive means adjacent the outer end of said drive shaft.

References Cited in the file of this patent

UNITED STATES PATENTS

| 963,186 | Trump | July 5, 1910 |
|---|---|---|
| 1,193,089 | Wagner et al. | Aug. 1, 1916 |
| 1,517,285 | Fischedick et al. | Dec. 2, 1924 |
| 1,638,796 | Cares et al. | Aug. 9, 1927 |
| 1,806,515 | Zoelly | May 19, 1931 |
| 2,309,154 | Adair | Jan. 26, 1943 |
| 2,356,590 | Jacobsen | Aug. 22, 1944 |
| 2,422,946 | Brittain | June 24, 1947 |
| 2,499,412 | Peterson | Mar. 7, 1950 |
| 2,655,265 | Little | Oct. 13, 1953 |
| 2,682,954 | Burman | July 6, 1954 |